United States Patent
Koebele et al.

(10) Patent No.: US 9,955,371 B1
(45) Date of Patent: Apr. 24, 2018

(54) METHOD FOR TESTING A DEVICE UNDER TEST, ELECTRONIC DEVICE, AND MEASUREMENT UNIT

(71) Applicant: Rohde & Schwarz GmbH & Co. KG, München (DE)

(72) Inventors: Johannes Koebele, Offenburg (DE); Heinz Mellein, Haar (DE); Thorsten Hertel, San Jose, CA (US)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/398,442

(22) Filed: Jan. 4, 2017

(51) Int. Cl.
H04W 24/00 (2009.01)
H04W 24/06 (2009.01)
H04W 56/00 (2009.01)
H04L 12/933 (2013.01)
H04W 72/04 (2009.01)

(52) U.S. Cl.
CPC .......... *H04W 24/06* (2013.01); *H04L 49/109* (2013.01); *H04W 56/0025* (2013.01); *H04W 72/0406* (2013.01)

(58) Field of Classification Search
CPC . H04W 8/245; H04W 24/00; H04M 1/72519; H04B 17/0042
USPC ............................ 455/423, 418, 550.1, 67.11
See application file for complete search history.

(56) References Cited

U.S. PATENT DOCUMENTS

| | | | |
|---|---|---|---|
| 2002/0119754 A1* | 8/2002 | Wakutsu | H04W 24/00 455/67.14 |
| 2004/0153890 A1* | 8/2004 | Davis | G01R 31/31908 714/699 |
| 2007/0254643 A1* | 11/2007 | Garcia | H04L 1/1867 455/423 |
| 2010/0327766 A1* | 12/2010 | Recker | H02J 9/02 315/291 |
| 2011/0237199 A1* | 9/2011 | Venkataraman | H04B 17/24 455/67.11 |
| 2012/0042213 A1* | 2/2012 | Zimmerman | H04L 43/12 714/46 |
| 2014/0087668 A1* | 3/2014 | Mow | H04W 24/00 455/67.14 |
| 2014/0270211 A1* | 9/2014 | Solum | H04R 25/554 381/60 |
| 2017/0103028 A1* | 4/2017 | Neeb | G06F 13/1673 |
| 2017/0111258 A1* | 4/2017 | Bezold | H04L 43/50 |
| 2017/0127191 A1* | 5/2017 | Solum | H04R 25/305 |
| 2017/0180372 A1* | 6/2017 | Bezold | H04L 63/08 |

* cited by examiner

*Primary Examiner* — Danh Le
(74) *Attorney, Agent, or Firm* — Shumaker & Sieffert, P.A.

(57) ABSTRACT

A test method for testing a device under test with a measurement unit comprises transmitting a number of test commands from the measurement unit to the device under test via a test interface of the device under test, generating in the device under test in response to the test commands respective communication signals, emitting by the device under test the generated communication signals via a wireless communication interface, receiving signals from the device under test in the measurement unit, and evaluating the received signals in the measurement unit.

47 Claims, 7 Drawing Sheets

METHOD FOR TESTING A DEVICE UNDER TEST, ELECTRONIC DEVICE, AND MEASUREMENT UNIT

TECHNICAL FIELD

The present invention relates to a test method for testing a device under test. The present invention further relates to an electronic device and a measurement unit.

BACKGROUND

Although applicable in principal to any communication system, the present invention and its underlying problem will be hereinafter described in combination with testing of mobile devices.

Modern communication devices may be used in a plurality of applications. Especially such communication devices are not used exclusively in conversation systems, like e.g. mobile telephone systems. Modern communication devices instead may be used e.g. in IoT applications (Internet-of-Things), as sensors and/or actuators, or the like.

Such devices will primarily communicate via a wireless interface and may e.g. use LTE, 5G, WLAN/WIFI, ZigBee, Bluetooth communication interfaces or any other type of wireless communication interface that adequately suits the respective application.

During development or production or conformance testing of such communication devices, specific tests have to be performed with the communication devices. Such tests are needed to make sure that the communication device complies with the respective legal and/or standards related regulations.

For performing the respective tests, the user device, i.e. the final product, is usually contacted via its communication interface by establishing a connection according to the respective communication standard.

Against this background, the problem addressed by the present invention is to improve the testing of mobile devices.

SUMMARY

The present invention solves this object by a test method with the features of claim 1, an electronic device with the features of claim 27, and a measurement unit with the features of claim 40.

Accordingly it is provided:

A test method for testing a device under test with a measurement unit, the method comprising transmitting a number, i.e. one or more, of test commands from the measurement unit to the device under test via a test interface of the device under test, generating in the device under test in response to the test commands respective communication signals, emitting by the device under test the generated communication signals via a wireless communication interface, receiving the communication signals from the device under test in the measurement unit, and evaluating the received communication signals in the measurement unit.

Further, it is provided:

An electronic device comprising a test interface for receiving a number of test commands from a measurement unit and/or sending test data to the measurement unit, a test controller for generating respective communication signals in response to the test commands, and a wireless communication interface for emitting the generated communication signals and/or for receiving communication signals from the measurement unit.

Further, it is provided:

A measurement unit comprising a test interface for transmitting a number of test commands to a device under test and/or receiving test data from the device under test, a communication interface for receiving communication signals from the device under test that are generated in response to the test commands by the device under test and/or sending communication signals to the device under test, and a test controller for evaluating the received communication signals in the measurement unit.

A test system comprising a measurement unit according to the present invention, and an electronic device according to the present invention.

The present invention is based on the finding that usually a complex procedure is performed to establish a communication with a user device via its communication interface.

The present invention therefore separates the communication interface and the test interface, at least logically, and allows directly providing test commands to the device under test without prior establishment of a communication via the communication interface.

The test interface may e.g. communicate via a dedicated test interface that allows quick and efficient communication in a specific environment, like e.g. during device development or production, where dedicated test chambers may provide such an environment, especially an environment with reduced external interferences. Therefore, the test interface may in contrast to the communication interface be simplified because e.g. no multi device communication may be necessary and reduced error correction mechanisms may be needed.

In addition, with the help of the test interface the device under test can be contacted in an early stage of development or production, since with the reduced complexity of the test interface communication may be possible without all the peripherals needed by the communication interface.

The communication interface can exemplarily comprise a high speed communication interface like e.g. used in LTE, 5G or WLAN communication. In contrast the test interface can comprise any communication interface that provides a point-to-point communication between the device under test and the measurement unit.

Further embodiments of the present invention are subject of the further subclaims and of the following description, referring to the drawings.

In a possible embodiment, the method may comprise transmitting communication signals from the measurement unit to the device under test and/or receiving test data, e.g. measurement values, from the device under test.

In a possible embodiment, the test commands may be individually transmitted from the measurement unit to the device under test and may be individually executed by the device under test. This arrangement allows for a step-by-step testing and an individual control of the test execution by the measurement unit. The measurement unit can e.g. initiate the testing of the device under test by first transmitting individual configuration commands that put the device under test into the required state and perform the test by transmitting single signal generation commands that cause the device under test to generate and emit the respective communication signals. The emitted test signals can then be received by the measurement unit and be evaluated accordingly.

In a possible embodiment, the test commands may be transmitted from the measurement unit to the device under test in groups. Transmitting test commands to the device under test in groups allows improving the efficiency of the test command transmission because e.g. one communication session or message can be used to transmit the group of test commands, and no protocol overhead for transmitting the test commands in multiple sessions or messages is generated.

It is understood, that the device under test may execute the group-wise transmitted test commands individually one after the other, e.g. execute the next test command directly after execution of one test command is finished.

In a possible embodiment, the test commands may be executed by the device under test group-wise. The device under test may e.g. execute a group of test commands after it is received. This means that the device under test may execute test commands of the group sequentially as a whole and pause after the execution of the group of test commands and e.g. wait for further test commands. If another group or individual command has been transmitted during the execution of the first group of test commands the device under test may directly start executing the further group of test commands or the individual test command. Alternatively, the new group of test commands or the individual command may specify for the device under test how to proceed with the test execution, as e.g. indicated below.

In a possible embodiment, the test commands may be executed by the device under test individually at a predetermined rate, i.e. at a predetermined rate of test commands per second or with a predetermined delay between the executions of the test commands, or based on an execution step test command. The device under test may e.g. comprise a pre-set delay value that it may use when executing test commands of a test group. This delay value may also be used when a first group is finished and further test commands have been received by the device under test. As an alternative, the device under test may wait for a dedicated execution step test command. This execution step test command may e.g. instruct the device under test to perform the next test command.

In a possible embodiment, at least one test command may comprise a delay value, and the device under test may delay the execution of a test command according to the delay value specified in the previous command. As will be understood, this does not apply to the first test command, i.e. the device under test will not wait according to a specified delay value, because no test command is preceding the first test command. The first test command may therefore be executed instantly or after receiving a respective test initiation test command that instructs the device under test to start the test execution. The test commands may each or only in some cases specify the delay value, e.g. in seconds, milliseconds or any other time measurement unit. Such a specified delay value will cause the device under test to delay the execution of the next test command for the respective amount of time.

In a possible embodiment, at least one test command may comprise a repetition configuration value, and the device under test may repeat a test command until the execution of the next test command if the repetition configuration value is positive.

In a possible embodiment, at least one test command may comprise a continue-during-repetition configuration value, and the device under test may repeat a test command and execute the next test command in parallel if the continue-during-repetition configuration value is positive.

Positive in this context may refer to the logical value. The repetition configuration value may however be a positive or negative logic value, i.e. a value of 0 may represent either a respective positive or negative logical value.

If a test command for example causes the device under test to generate and emit a specific signal, such a test command may comprise a delay value of e.g. 1 second and a positive repetition configuration value. This means that the device under test will continuously generate and emit the respective signal for one second and then continue to the next test command. Other test commands may start a background signal generation or generator that generates a signal continuously in the background, while the device under test continues executing test commands.

The continue-during-repetition configuration value will cause the device under test to execute two or more (if the continue-during-repetition configuration value is also set in the next test commands) test commands while repeating one test command. With the continue-during-repetition configuration value it is e.g. possible to start the generation of a signal, e.g. a continuous wave signal, in the device under test, and then modify the beam steering parameters with consecutive test commands. The generated signal will then be generated all the time, while the beam that emits the generated signal will vary according to the respective test commands.

In a possible embodiment, after transmitting a group of test commands to the device under test a test initiation command may be transmitted to the device under test that causes the device under test to initiate the execution of the transmitted group of test commands. With the test initiation command the execution of the test commands in the device under test may be controlled externally e.g. by the measurement unit. This allows synchronously starting the test execution in the device under test and the measurement unit.

In a possible embodiment, at least one of the test commands may cause the device under test to execute a sequence, or group, of test commands stored in the device under test. A series of standard relevant test procedures may be defined for the respective type of communication interface of the device under test. The device under test may comprise a memory for storing a number of predefined sequences of test commands that may e.g. relate to such standard relevant tests, or any other manufacturer implemented test procedure. The memory can be any type of non-volatile memory or volatile memory, if e.g. the contents are written during production and the power source is not disconnected from the device under test prior to executing the test procedures.

A test command may then select the respective sequence or group of test commands for execution.

In a possible embodiment, the device under test may be synchronized with the measuring unit by a synchronization test command. If e.g. a sequence of test commands is transmitted or a predefined sequence of test commands is selected in the device under test, the execution of the test command may be synchronized between the device under test and the measurement unit with the help of the synchronization test command. Such a synchronization test command may provide a common time base for the device under test and the measurement unit. Depending on the accuracy requirements such a synchronization test command may e.g. be provided by the measurement unit once prior to execution of a test procedure and/or multiple times during execution of a test procedure.

The test procedure may then be performed synchronously, e.g. based on a common time base, between the device under test and the measurement unit.

In a possible embodiment, the test interface may comprise a wired interface. As wired interface any type of interface, e.g. a serial interface or a parallel interface, may be provided. A wired interface may be provided if high robustness of the test communication via the test interface is needed, since the data lines may e.g. be shielded.

In a possible embodiment, the test interface may comprise a wireless interface. The wireless interface may be any type of wireless interface that is suitable for transmitting the test commands and receiving respective responses from the device under test. Such an interface may e.g. be a GSM interface, a Bluetooth interface, a RFID or NFC interface, or any other digital wireless interface.

In a possible embodiment, the test interface may comprise or be a wireless interface that uses other frequencies and/or other modulation schemes than the communication interface. The signal transmitted via the communication signal is the signal that has to be evaluated. If the test signals are transmitted over a test interface that uses other frequencies and/or modulation schemes, the test related communication with the device under test can be provided without causing interference in the communication signal or at least with reduced interference in the communication signal (i.e. the signal transmitted via the communication interface). Additionally, using lower frequencies and/or other MCS for the test interface may also improve reliability of the test interface connection.

In a possible embodiment, the communication interface may comprise at least part of the test interface. The communication interface may e.g. at least in part provide the hardware for the test interface. For example the communication interface and the test interface may share an antenna. The communication interface and the test interface may also share other hardware like e.g. a transceiver, a communication controller or the like. In an embodiment the communication interface may be used as the test interface.

In a possible embodiment, the device under test may comprise or be a single communication chip or SOC, System-On-Chip, and the measurement unit may comprise a test socket for the communication chip, wherein the test socket comprises a power source and at least one antenna for the communication chip. A single communication chip or SOC alone usually is not operable without at least a minimum of peripheral components. If however tests are to be performed in such an early stage of the device under test, dedicated test sockets may be provided that provide that minimum required peripherals. With the power source the communication chip or SOC may be powered up and initiate operation. The antenna may then allow the communication interface to transmit and receive data.

In a possible embodiment, the device under test may comprise or be a communication chipset or a communication module or a user device.

In a possible embodiment, the test commands may comprise test commands that cause the device under test to perform an instructed internal configuration.

In a possible embodiment, the test commands may comprise test commands that cause the device under test to set a plurality of predefined parameters of the device under test to predefined values. The test mode selector may set a plurality of configuration parameters at once. Such a plurality of configuration parameters may also be called a base configuration, especially for predefined test scenarios that are commonly repeated with different devices under test.

In a possible embodiment, the test commands may cause the device under test to perform an instructed internal configuration comprising test commands that cause the device under test to set reception and or transmission configuration parameters.

In a possible embodiment, the test commands may cause the device under test:
to set a carrier frequency for the generated communication signals and/or signal reception in the device under test,
to set a bandwidth for the generated communication signals and/or signal reception in the device under test,
to set a phase of a specific transmission channel for the generated communication signals and/or reception channel for signal reception in the device under test,
to set a modulation scheme for the generated communication signals and/or signal reception in the device under test, e.g. a specific modulation and coding scheme, MCS, as used e.g. in the LTE communication systems,
to set a transmit power for the generated communication signals, wherein the respective test commands comprise a single power value or a sequence of power values that the device under test sets at a predetermined step frequency, and/or
to set an attenuation factor for the signal reception in the device under test.

In a possible embodiment, the device under test may comprise at least two antennas, e.g. dedicated antennas or antenna elements of an antenna array, and the test commands may comprise test commands that cause the device under test:
to select a specific one of the antennas, or antenna elements, for signal transmission and/or signal reception,
to select a specific group of the antennas, or antenna elements, for signal transmission and/or signal reception,
to set bearing parameters, which may also be called beam steering parameters or steering parameters, specified in the respective test command,
to use a fixed beam operation or adaptive beam operation, and/or
to use a single-output-single-input mode of operation or a multiple-input-multiple-output mode of operation for signal transmission and/or signal reception.

The bearing parameters refer to a direction in which the beam formed by the at least two antennas is directed. A fixed beam operation refers to a mode of operation in which the direction of the beam is constant. In contrast, adaptive beam operation refers to a mode of operation in which the direction of the beam is automatically steered by the device under test to the direction of the received communication signal which is emitted by the measurement unit.

In another embodiment, the device under test may comprise only one antenna.

In a possible embodiment, the test commands may comprise test commands that cause the device under test to perform signal generation or reception as specified in the respective test command.

In a possible embodiment, the test commands may comprise test commands that cause the device under test:
to generate and/or receive a continuous wave signal,
to generate and/or receive a signal according to a predetermined signal format e.g. LTE, 5G, GSM, Bluetooth or the like.

In a possible embodiment, the test commands may comprise test commands that instruct the device under test:
to activate or deactivate generation and/or reception of test signals,
to perform a reset, and/or
to turn on or off.

In a possible embodiment, the test commands may comprise test commands that request information from the device under test and cause the device under test to provide:
product information, like e.g. a vendor ID, software/firmware version information, hardware version information or the like,
operational status information, e.g. for an active status, a ready status, an idle status, an off status or the like,
a MAC block counter, e.g. as defined as measurement value in mobile communication standards for GSM, UMTS or LTE, and especially including BLER/TP measurements,
reception power information, e.g. for a single antenna or antenna element or a plurality of antennas or antenna elements of an antenna array of the device under test,
absolute or relative phase information, e.g. for a single antenna or antenna element or a plurality of antennas or antenna elements of an antenna array of the device under test. The relative phase information can be especially useful with MIMO operation,
RSRP information, e.g. for a single antenna or antenna element or a plurality of antennas or antenna elements of an antenna array of the device under test,
ATF information, e.g. for a single antenna or antenna element or a plurality of antennas or antenna elements of an antenna array of the device under test, and/or
RSSI information, e.g. for a single antenna or antenna element or a plurality of antennas or antenna elements of an antenna array of the device under test.

The term "MAC block counter" refers to a value that represents the number of received valid blocks on the MAC layer.

The term "BLER/TP" measurements refers to block error rate and throughput measurements.

The term "RSRP" information refers to the reference signals received power that is the average power received from a single reference signal.

The term "ATF" information refers to the antenna test function that is defined in 3GPP TR 36.978 standard, which is incorporated in its entirety by reference.

The term "RSSI" information refers to the received signal strength indicator that is a measurement of the power in a received radio signal.

In general, the commands that request information from the device under test may cause the device under test to provide any information that the device under test has present internally or that the device under test may measure in incoming or outgoing signals. Such information may be transmitted from the device under test to the measurement unit via any one of the interfaces.

In a possible embodiment, the test commands may comprise test commands that comprise synchronization information.

The test controller of the electronic device may e.g. be provided as a separate or dedicated logic controller. As an alternative the test controller of the electronic device may e.g. be provided at least in part as a firmware or software that is executed by a general purpose controller or any other controller of the electronic device. The same applies to the test controller of the measurement unit.

Any interface, like the test interfaces and the communication interfaces of the electronic device or the measurement unit, may comprise receivers, transmitters, transceivers, protocol controllers, analogue circuitry, like filters, attenuators or the like, that are needed to implement the respective interface.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
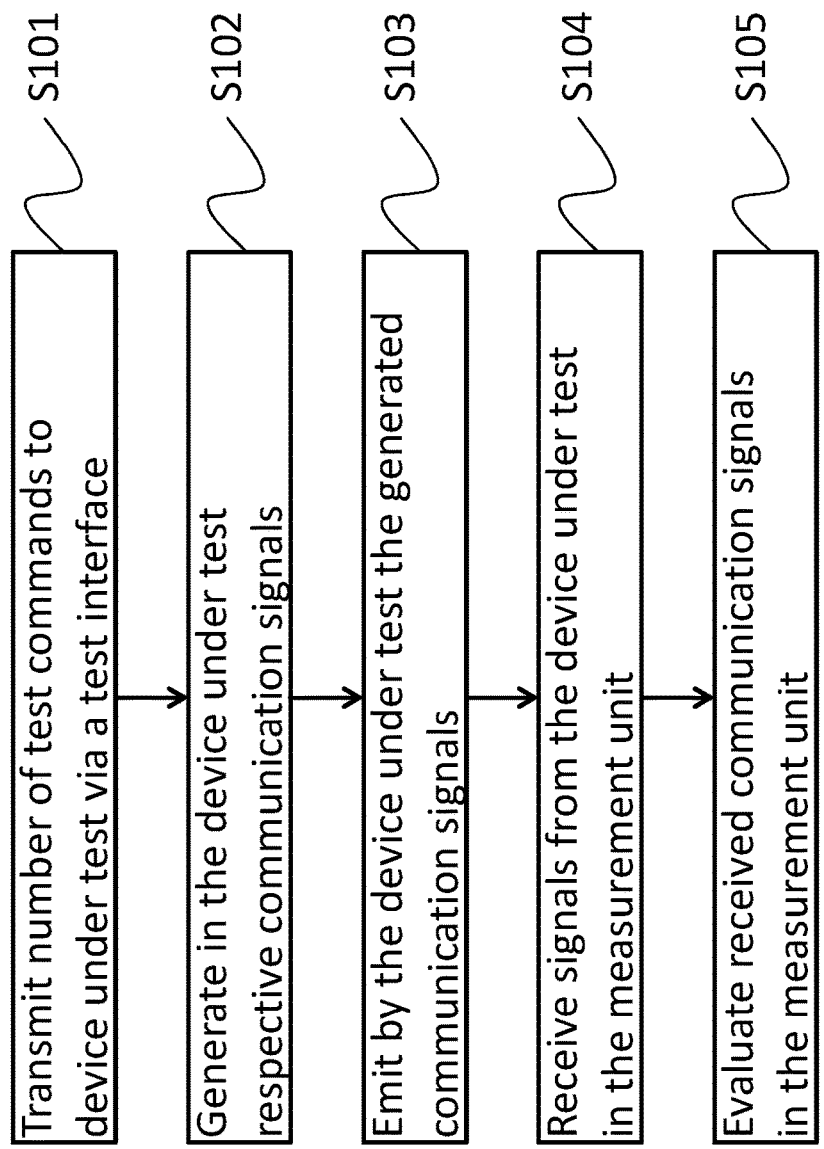
FIG. 1 shows a flow diagram of an embodiment of a method according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

For ease of understanding the reference signs used in the apparatus-related figures will be used throughout the description of the method-related figures.

FIG. 1 shows a flow diagram of a method for testing a device under test 100 with a measurement unit 200. The device under test 100 may e.g. comprise a single communication chip or SOC, System-On-Chip, and the measurement unit 200 may comprise a test socket for the communication chip, wherein the test socket comprises a power source and at least one antenna for the communication chip. Alternatively, the device under test 100 may comprise a communication chipset or a communication module or a user device that is functional with minimal or no further peripherals, like e.g. only with a power supply.

The method comprises transmitting S101 a number of test commands 102, 202 from the measurement unit 200 to the device under test 100 via a test interface 101, 201. In the device under test 100 in response to the test commands 102, 202 respective communication signals 104, 204 are generated S102 and emitted S103 by the device under test 100 via a wireless communication interface 105, 203.

The test interface 101, 201 and the communication interface 105, 203 may be different types of interfaces. The communication interface 105, 203 can e.g. be a communication interface 105, 203 that communicates according to a communication standard, like e.g. GSM, UMTS, LTE, 5G, WLAN/WIFI, Bluetooth or the like.

It is understood, that the communication interface 105, 203 may comprise all necessary components to communicate according to the respective communication standard, like e.g. digital protocol controllers, digital-to-analogue converters, analogue-to-digital converters, filters, amplifiers, attenuators or the like. The same applies to the test interface 101, 201.

The test interface 101, 201 may comprise a wired interface or a wireless interface. In an embodiment the communication interface 105, 203 can at least partially comprise the test interface 101, 201.

To reduce the interference between the test interface 101, 201 and the communication interface 105, 203, the test interface 101, 201 may comprises a wireless interface that uses other frequencies and/or other modulation schemes than the communication interface 105, 203. For example the communication interface 105, 203 may be high speed interface, like e.g. a LTE or 5G interface, capable of beam forming and the test interface 101, 201 may be a GSM, Bluetooth or NFC interface. Alternatively the communication interface can also be used as test interface.

The communication signals 104,204 emitted by the test device are then received S104 in the measurement unit 200, and evaluated S105 according to a predetermined test scenario. Such a test scenario may e.g. determine the test commands 102, 202 and the respective communication signals 104,204 or any property of the communication signals 104,204 that are expected. Evaluating S105 may then comprise comparing the received communication signals 104,204 with the expected communication signals 104,204 or the respective properties.

The test commands 102, 202 may be transmitted from the measurement unit 200 to the device under test 100 individually and may be individually executed by the device under test 100. However, the test commands 102, 202 may also be transmitted from the measurement unit 200 to the device under test 100 in groups. The test commands 102, 202 may then be executed by the device under test 100 group-wise or individually, e.g. after transmitting a test initiation command to the device under test 100 that causes the device under test 100 to initiate the execution of the transmitted test command 102, 202 or group of test commands 102, 202. The test device may e.g. execute the test commands 102, 202 at a predetermined rate or based on an execution step test command 102, 202. The execution step test command 102, 202 causes the execution of the next test command 102, 202. Test commands 102, 202 may also comprise a delay value. The device under test 100 will then delay the execution of a test command 102, 202 according to the delay value specified in the previous command.

In addition test commands 102, 202 may comprise a repetition configuration value. The device under test 100 will repeat a test command 102, 202 until the execution of the next test command 102, 202 if the repetition configuration value is positive. Alternatively or in addition, test commands 102, 202 may comprise a continue-during-repetition configuration value. The device under test 100 will repeat a test command 102, 202 and execute the next test command 102, 202 in parallel if the continue-during-repetition configuration value is positive. Test commands 102, 202 may also cause the device under test 100 to execute a sequence of test commands 102, 202 stored in the device under test 100. Further, the device under test 100 may be synchronized with the measuring unit by a synchronization test command 102, 202.

In the following different possible test commands 102, 202 will be explained. It is understood, that this list is just exemplarily presented and that further test commands 102, 202 are possible.

The test commands 102, 202 may comprise test commands 102, 202 that cause the device under test 100 to perform an instructed internal configuration.

The test commands 102, 202 may comprise test commands 102, 202 that cause the device under test 100 to set a plurality of predefined parameters of the device under test 100 to predefined values. The test mode selector may set a plurality of configuration parameters at once. Such a plurality of configuration parameters may also be called a base configuration, especially for predefined test scenarios that are commonly repeated with different devices under test.

The test commands 102, 202 that may cause the device under test 100 to perform an instructed internal configuration may comprise test commands 102, 202 that cause the device under test 100 to set reception and or transmission configuration parameters.

The test commands 102, 202 may cause the device under test 100:
- to set a carrier frequency for the generated communication signals 104,204 and/or signal reception in the device under test 100,
- to set a bandwidth for the generated communication signals 104,204 and/or signal reception in the device under test 100,
- to set a phase of a specific transmission channel for the generated communication signals 104,204 and/or reception channel for signal reception in the device under test 100,
- to set a modulation scheme for the generated communication signals 104,204 and/or signal reception in the device under test 100, e.g. a specific modulation and coding scheme MCS, as used e.g. in the LTE communication systems,
- to set a transmit power for the generated communication signals 104,204, wherein the respective test commands 102, 202 comprise a single power value or a sequence of power values that the device under test 100 sets at a predetermined step frequency, and/or
- to set a attenuation factor for the signal reception in the device under test 100.

The device under test 100 may comprise at least two antennas, e.g. dedicated antennas or antenna elements of an antenna array, and the test commands 102, 202 may comprise test commands 102, 202 that cause the device under test 100:
- to select a specific one of the antennas, or antenna elements, for signal transmission and/or signal reception,
- to select a specific group of the antennas, or antenna elements, for signal transmission and/or signal reception,
- to set bearing parameters specified in the respective test command 102, 202,
- to use a fixed beam operation or adaptive beam operation, and/or
- to use a single-input-single-output mode of operation or a multiple-input-multiple-output mode of operation for signal transmission and/or signal reception.

The test commands 102, 202 may comprise test commands 102, 202 that cause the device under test 100 to perform signal generation or reception as specified in the respective test command 102, 202.

The test commands 102, 202 may comprise test commands 102, 202 that cause the device under test 100:
- to generate and/or receive a continuous wave signal,
- to generate and/or receive a signal according to a predetermined signal format e.g. LTE, 5G, GSM, Bluetooth or the like.

The test commands 102, 202 may comprise test commands 102, 202 that instruct the device under test 100:
- to activate or deactivate generation and/or reception of test signals,
- to perform a reset, and/or
- to turn on or off.

The test commands 102, 202 may comprise test commands 102, 202 that request information from the device under test 100 and cause the device under test 100 to provide:
- product information, like e.g. a vendor ID, software/firmware version information, hardware version information or the like,
- operational status information, e.g. for an active status, a ready status, an idle status, an off status or the like,
- a MAC block counter, e.g. as defined as measurement value in mobile communication standards for GSM, UMTS or LTE, and especially including BLER/TP measurements,
- reception power information, e.g. for a single antenna or antenna element or a plurality of antennas or antenna elements of an antenna array of the device under test 100,
- absolute or relative phase information, e.g. for a single antenna or antenna element or a plurality of antennas or antenna elements of an antenna array of the device under test 100. The relative phase information can be especially useful with MIMO operation,
- RSRP information, e.g. for a single antenna or antenna element or a plurality of antennas or antenna elements of an antenna array of the device under test 100,
- ATF information, e.g. for a single antenna or antenna element or a plurality of antennas or antenna elements of an antenna array of the device under test 100, and/or
- RSSI information, e.g. for a single antenna or antenna element or a plurality of antennas or antenna elements of an antenna array of the device under test 100.

The test commands 102, 202 that request information from the device under test 100 may cause the device under test 100 to provide any information that the device under test 100 has present internally or that the device under test 100 may measure in incoming or outgoing signals.

The test commands 102, 202 may comprise test commands 102, 202 that comprise synchronization information.

Figure 2:
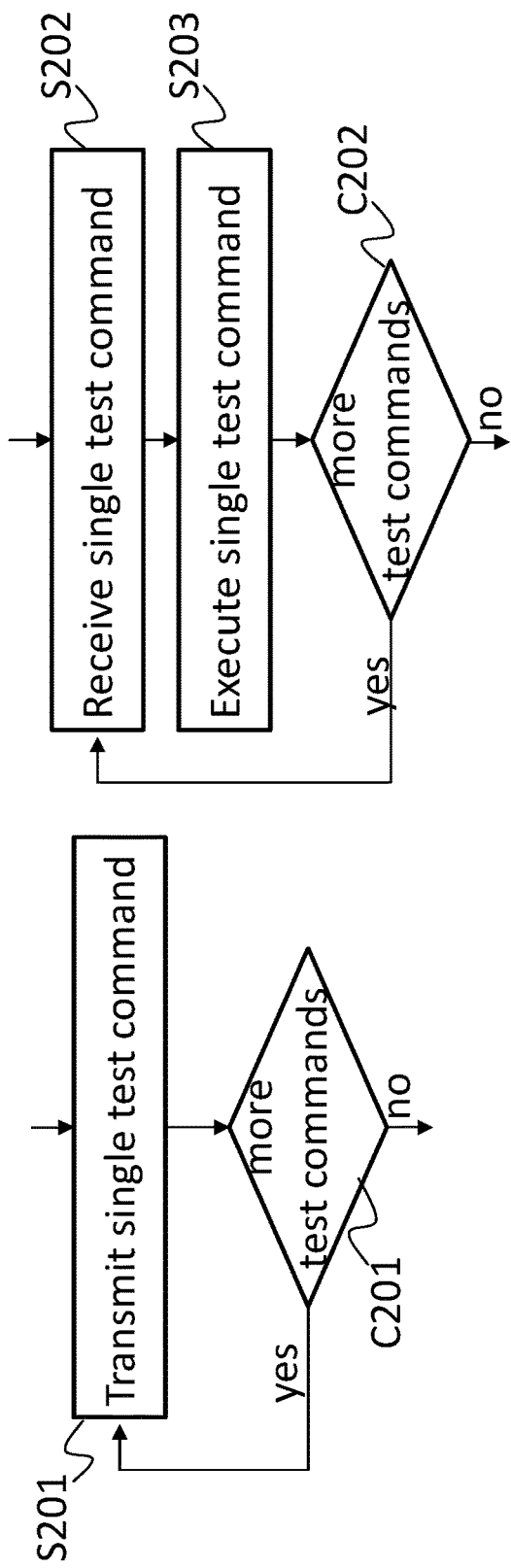
FIG. 2 shows a flow diagram of another embodiment of a method according to the present invention.
Figure 3:
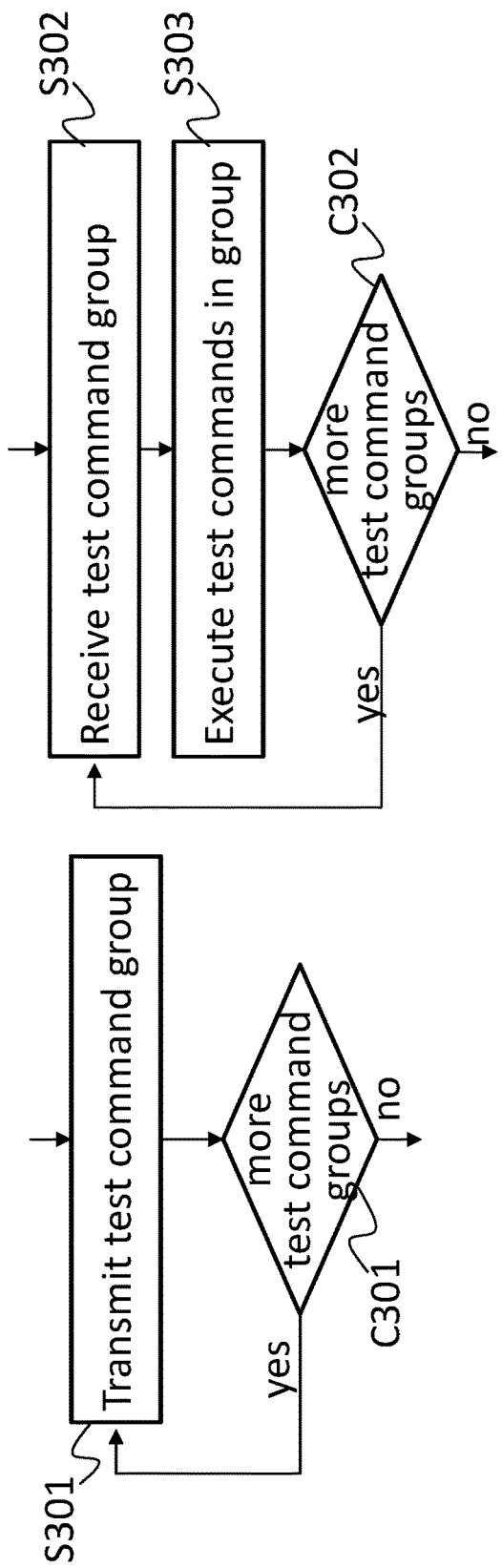
FIG. 3 shows a flow diagram of another embodiment of a method according to the present invention.
Figure 4:
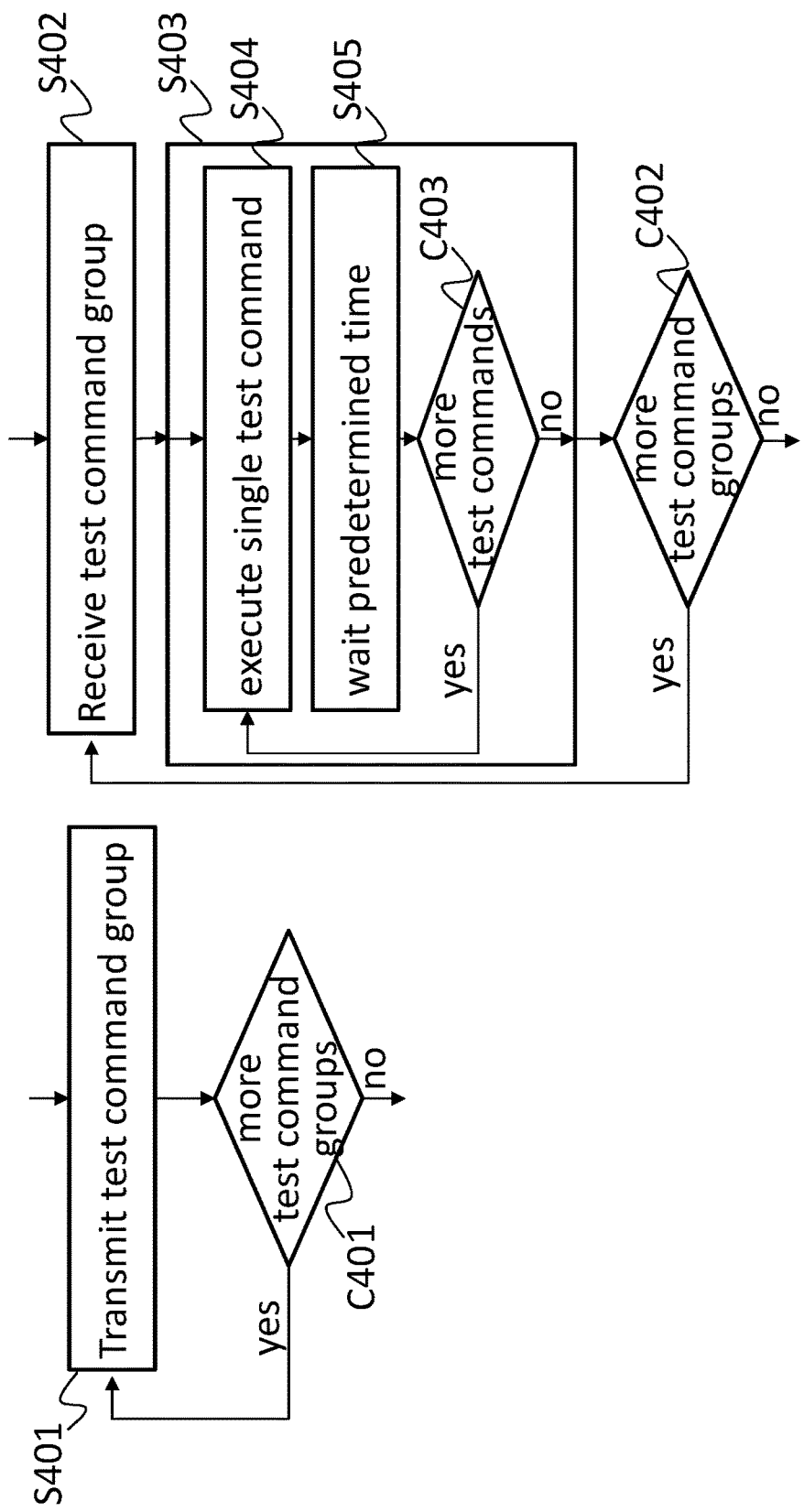
FIG. 4 shows a flow diagram of another embodiment of a method according to the present invention.

In FIGS. 2-4 the left sequence shows a sequence that is executed in the measurement unit 200 and the right sequence shows a sequence that is executed in the device under test 100.

FIG. 2 exemplifies how test commands 102, 202 may be sent to and executed in the device under test 100 individually.

First, a single test command 102, 202 is transmitted S201 to the device under test 100. In check C201 it is tested if more test commands 102, 202 are pending. If so, a further test command 102, 202 is transmitted S201.

At the same time in the device under test 100 the single test command 102, 202 is received S202 and executed S203. In check C202 it is tested if more test commands 102, 202 are transmitted to the device under test 100. If so, the next test command 102, 202 is received S202 and executed S203, until no further test commands 102, 202 are transmitted.

FIG. 3 exemplifies how test commands 102, 202 may be sent to and executed in the device under test 100 in groups.

First, a group of test commands 102, 202 is transmitted S301 to the device under test 100. In check C301 it is tested if more groups of test commands 102, 202 are pending. If so, a further group of test commands 102, 202 is transmitted S301.

At the same time in the device under test 100 the group of test commands 102, 202 is received S302 and all the test commands 102, 202 of the group are executed S303. In check C302 it is tested if more groups of test commands 102, 202 are transmitted to the device under test 100. If so, the next group of test commands 102, 202 is received S302 and executed S303, until no further groups of test commands 102, 202 are transmitted.

The flow diagram of FIG. 4 is based on the flow diagram of FIG. 3 and further details an embodiment of the execution S403 of the group of test commands 102, 202.

After receiving S402 the group of test commands 102, 202, a single test command 102, 202 is executed S404, after executing the single test command 102, 202 the device under test 100 waits S405 for a predetermined delay time, waiting S405 may be optional. This delay time may be predetermined or provided in the single test commands 102, 202 or be set by a specific test command 102, 202 prior to initiating the test procedure.

In check C403 it is verified if more test commands 102, 202 are present in the received group of test commands 102, 202. If so, the next test command 102, 202 is executed S404. If no more test commands 102, 202 are present in the received group of test commands 102, 202, in check C402 it is verified if more groups of test commands 102, 202 are received.

It is understood, that although not explicitly shown, in the measuring unit receiving and evaluating communication signals 104, 204, which are generated in the device under test 100, may be performed in parallel to the sequences shown in FIGS. 2-4.

Figure 5:
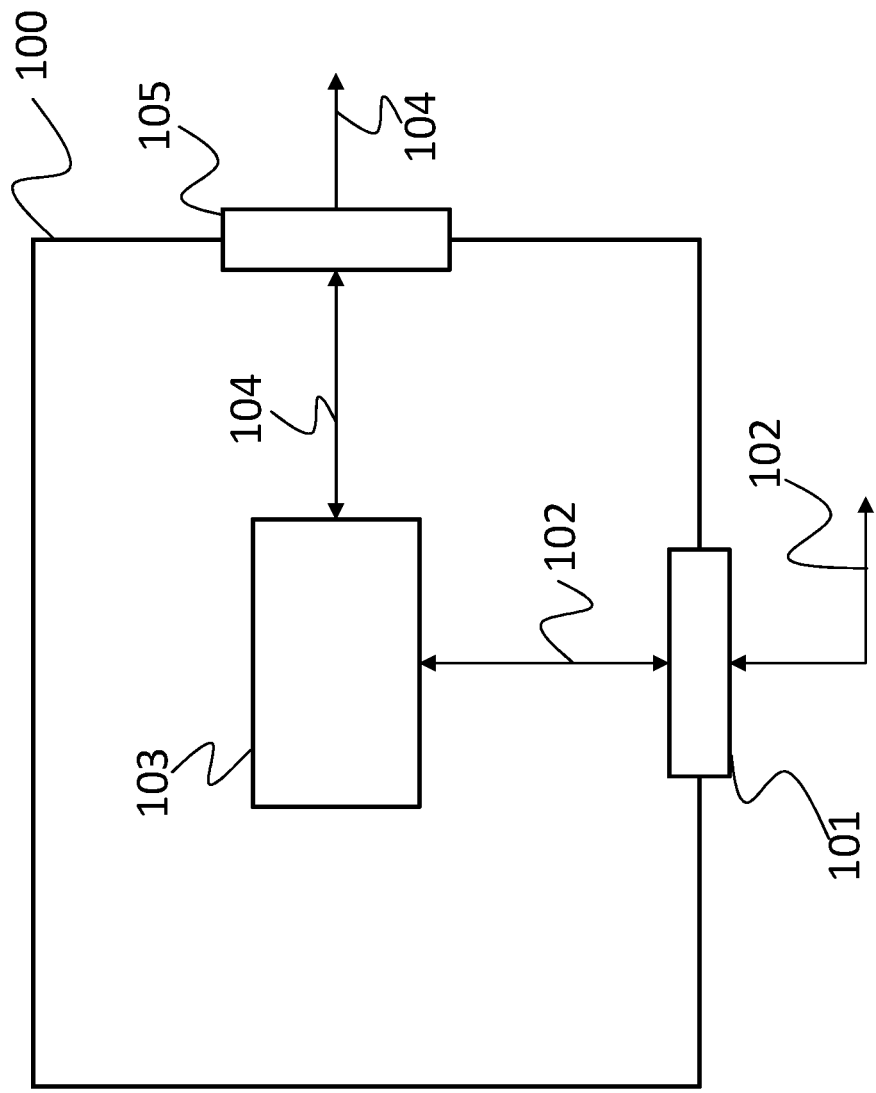
FIG. 5 shows a block diagram of an embodiment of an electronic device according to the present invention.

FIG. 5 shows a block diagram of an electronic device 100. The electronic device 100 comprises a test interface 101 that is coupled to a test controller 103. The test controller 103 is further coupled to a communication interface 105.

The test interface 101 serves to receive test commands 102. As can be seen in FIG. 5 the test interface 101 may be bi-directional. That means that the electronic device 100 may also provide test data via the test interface 101. The same applies to the communication interface, which may be used to send and receive signals by the electronic device 100.

The received test commands 102 are transmitted from the test interface 101 to the test controller 103. The test controller 103 is responsible for evaluating the received test commands 102 and performing the respective actions, like e.g. generating communication signals 104. The generated communication signals 104 are then transmitted to the communication interface 105. The communication interface 105 may e.g. comprise a high speed communication interface like e.g. used in LTE, 5G or WLAN communication, especially an interface that uses MIMO and beamforming. The test interface 101 in contrast may be a wired or wireless low speed interface, like e.g. GSM, Bluetooth, or the like, wherein low speed only refers to the speed compared to the communication interface 105.

Figure 6:
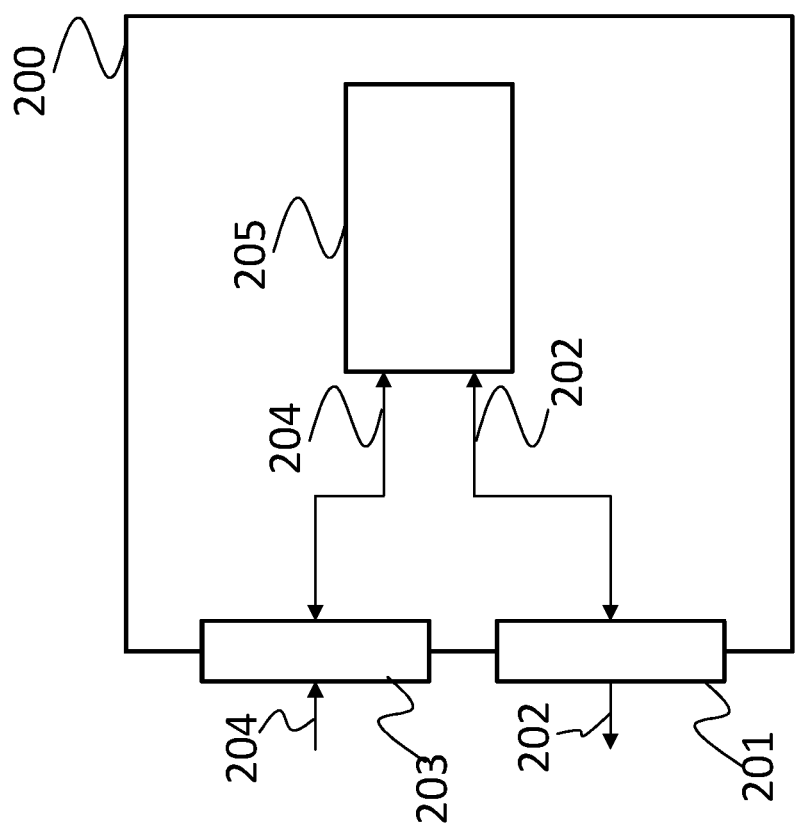
FIG. 6 shows a block diagram of an embodiment of a measurement unit according to the present invention.

FIG. 6 shows a block diagram of an embodiment of a measurement unit 200 according to the present invention.

The measurement unit 200 comprises a test interface 201 that is connected to a test controller 205. The test controller 205 is further coupled to a communication interface 203.

The test interface 201 transmits test commands 202 to the device under test (not shown in FIG. 6). The test commands 202 may be provided by the test controller 205. It is understood, that other sources for the test commands 202 are possible, like e.g. a test command memory. The test interface 201 may be bi-directional. That means that the measurement unit 200 may also receive test data via the test interface 201. The same applies to the communication interface 203, which may be used to send and receive signals from the electronic device 100.

The communication interface 203 will then receive the communication signals 204, that are generated by the device under test in response to the test commands 202. The received communication signals 204 are then provided to the test controller 205 for evaluation.

The above explanations regarding the test interface 101 and the communication interface 105 are also valid for the test interface 201 and the communication interface 203.

Figure 7:
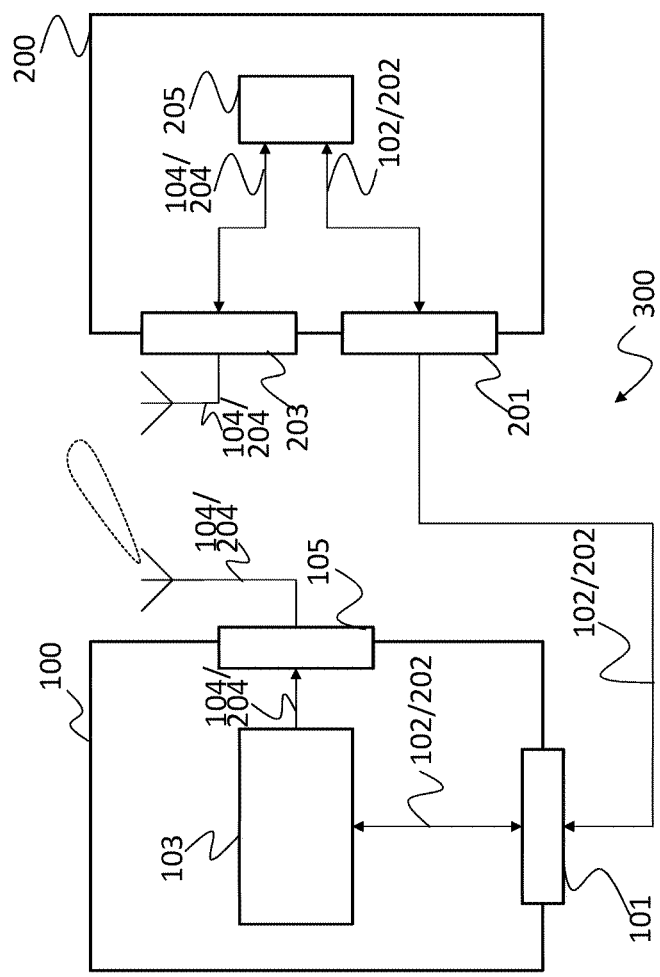
FIG. 7 shows a block diagram of an embodiment of a system according to the present invention.

FIG. 7 shows a block diagram of a system 300. The system 300 comprises a measurement unit 200 and a device under test 100 as explained above in conjunction with FIGS. 5 and 6. The communication interfaces 105, 203 may e.g. be LTE or 5G interfaces that use beamforming.

Although shown as wired interface, the test interfaces 101, 201 may also be wireless interfaces.

The system 300 of FIG. 7 may be used to perform a method as describe above in conjunction with FIGS. 1 to 4.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100 device under test
101 test interface
102 test commands
103 test controller
104 communication signals
105 communication interface
200 measurement unit
201 test interface
202 test commands
203 communication interface
204 communication signals
205 test controller
300 system
S101-S105 method actions
S201-S203 method actions
S301-S303 method actions
S401-S405 method actions
C201, C202, C301, C302 verification block
C401, C402, C403 verification block

The invention claimed is:

1. A test method for testing a device under test with a measurement unit, the method comprising:
    transmitting a number of test commands from the measurement unit to the device under test via a test interface of the device under test,
    generating in the device under test in response to the test commands respective communication signals,
    emitting by the device under test the generated communication signals via a wireless communication interface,
    receiving the communication signals from the device under test in the measurement unit, and
    evaluating the received communication signals in the measurement unit,
    wherein the test commands comprise test commands that cause the device under test to perform an instructed internal configuration, and
    wherein the test commands cause the device under test:
        to set a carrier frequency for the generated communication signals and/or signal reception in the device under test,
        to set a bandwidth for the generated communication signals and/or signal reception in the device under test,
        to set a phase of a specific transmission channel for the generated communication signals and/or reception channel for signal reception in the device under test,
        to set a modulation scheme for the generated communication signals and/or signal reception in the device under test,
        to set a transmit power for the generated communication signals, wherein the respective test commands comprise a single power value or a sequence of power values that the device under test sets at a predetermined step frequency, and
        to set a attenuation factor for the signal reception in the device under test.

2. The test method of claim 1, further comprising transmitting communication signals from the measurement unit to the device under test and/or receiving test data from the device under test.

3. The test method of claim 1, wherein the test commands are individually transmitted from the measurement unit to the device under test and are individually executed by the device under test.

4. The test method of claim 1, wherein the test commands are transmitted from the measurement unit to the device under test in groups.

5. The test method of claim 4, wherein the test commands are executed by the device under test group-wise.

6. The test method of claim 4, wherein the test commands are executed by the device under test individually at a predetermined rate or based on an execution step test command.

7. The test method of claim 4, wherein at least one test command comprises a delay value, and wherein the device under test delays the execution of a test command according to the delay value specified in the previous command.

8. The test method of claim 4, wherein at least one test command comprises a repetition configuration value, and wherein the device under test repeats a test command until the execution of the next test command if the repetition configuration value is positive, and/or
wherein at least one test command comprises a continue-during-repetition configuration value, and wherein the device under test repeats a test command and executes the next test command in parallel if the continue-during-repetition configuration value is positive.

9. The test method of claim 4, wherein after transmitting a group of test commands to the device under test a test initiation command is transmitted to the device under test that causes the device under test to initiate the execution of the transmitted group of test commands.

10. The test method of claim 1, wherein the test commands cause the device under test to execute a sequence of test commands stored in the device under test.

11. The test method of claim 1, wherein the device under test is synchronized with the measuring unit by a synchronization test command.

12. The test method of claim 1, wherein the test interface comprises a wired interface.

13. The test method of claim 1, wherein the test interface comprises a wireless interface.

14. The test method of claim 13, wherein the test interface comprises a wireless interface that uses other frequencies and/or other modulation schemes than the communication interface.

15. The test method of claim 13, wherein the communication interface comprises at least part of the test interface.

16. The test method of claim 1, wherein the device under test comprises a single communication chip or SOC, System-On-Chip, and the measurement unit comprises a test socket for the communication chip, wherein the test socket comprises a power source and at least one antenna for the communication chip.

17. The test method of claim 1, wherein the device under test comprises a communication chip set or a communication module or a user device.

18. The test method of claim 1, wherein the test commands comprise test commands that cause the device under test set a plurality of predefined parameters of the device under test to predefined values.

19. The test method of claim 1, wherein the test commands that cause the device under test to perform an instructed internal configuration comprise test commands that cause the device under test to set reception and or transmission configuration parameters.

20. The test method of claim 1, wherein the test commands cause the device under test:
to set a carrier frequency for the generated communication signals and/or signal reception in the device under test.

21. The test method of claim 1, wherein the device under test comprises at least two antennas, and wherein the test commands comprise test commands that cause the device under test:
to select a specific one of the antennas for signal transmission and/or signal reception,
to select a specific group of the antennas for signal transmission and/or signal reception,
to set bearing parameters specified in the respective test command,
to use a fixed beam operation or adaptive beam operation, and/or
to use a single-output-single-input mode of operation or a multiple-input-multiple-output mode of operation for signal transmission and/or signal reception.

22. The test method of claim 21, wherein the test commands comprise test commands that cause the device under test:
to use a fixed beam operation or adaptive beam operation.

23. The test method of claim 1, wherein the test commands comprise test commands that cause the device under test to perform signal generation or reception as specified in the respective test command.

24. The test method of claim 23, wherein the test commands comprise test commands that cause the device under test:
to generate and/or receive a continuous wave signal,
to generate and/or receive a signal according to a predetermined signal format.

25. The test method of claim 1, wherein the test commands comprise test commands that instruct the device under test:
to activate or deactivate generation and/or reception of test signals,
to perform a reset, and/or
to turn on or off.

26. The test method of claim 1, wherein the test commands comprise test commands that request information from the device under test and cause the device under test to provide:
product information,
operational status information,
a MAC block counter,
reception power information,
absolute or relative phase information,
RSRP information,
ATF information, and/or
RSSI information.

27. The test method of claim 1, wherein the test commands comprise test commands that comprise synchronization information.

28. An electronic device comprising:
a test interface for receiving a number of test commands from a measurement unit and/or sending test data to the measurement unit,
a test controller for generating respective communication signals in response to the test commands,
a wireless communication interface for emitting the generated communication signals and/or for receiving communication signals from the measurement unit, wherein the test commands comprise test commands that cause the device under test to perform an instructed internal configuration, and wherein the test commands cause the device under test:
- to set a carrier frequency for the generated communication signals and/or signal reception in the device under test,
- to set a bandwidth for the generated communication signals and/or signal reception in the device under test,
- to set a phase of a specific transmission channel for the generated communication signals and/or reception channel for signal reception in the device under test,
- to set a modulation scheme for the generated communication signals and/or signal reception in the device under test,
- to set a transmit power for the generated communication signals, wherein the respective test commands comprise a single power value or a sequence of power values that the device under test sets at a predetermined step frequency, and
- to set a attenuation factor for the signal reception in the device under test.

29. The electronic device of claim 28, wherein the test interface receives the test commands individually from the measurement unit and wherein the test controller individually executes the test commands.

30. The electronic device of claim 28, wherein the test interface receives the test commands in groups.

31. The electronic device of claim 30, wherein the test commands are executed by the test controller group-wise.

32. The electronic device of claim 30, wherein the test commands are executed by the test controller individually at a predetermined rate or based on an execution step test command.

33. The electronic device of claim 30, wherein at least one test command comprises a delay value, and wherein the test controller delays the execution of a following test command according to the delay value specified in the at least one test command.

34. The electronic device of claim 30, wherein at least one test command comprises a repetition configuration value, and wherein the test controller repeats a test command until the execution of the next test command if the repetition configuration value is positive, and/or wherein at least one test command comprises a continue-during-repetition configuration value, and wherein the test controller repeats a test command and executes the next test command in parallel if the continue-during-repetition configuration value is positive.

35. The electronic device of claim 30, wherein when after receiving a group of test commands a test initiation command is received via the test interface, the test controller initiates the execution of the transmitted group of test commands.

36. The electronic device of claim 28, wherein the test commands cause the test controller to execute a sequence of test commands stored in a memory of the electronic device.

37. The electronic device of claim 28, wherein when a synchronization test command is received, the test controller synchronizes with the measuring unit based on the synchronization test command.

38. The electronic device of claim 28,
wherein the test interface comprises a wired interface, or wherein the test interface comprises a wireless interface, especially a wireless interface that uses other frequencies and/or other modulation schemes than the communication interface.

39. The electronic device of claim 28, wherein the communication interface comprises at least part of the test interface.

40. The electronic device of claim 28, wherein the electronic device comprises a single communication chip or System-On-Chip, or wherein the electronic device comprises a communication chip set or a communication module or a user device.

41. A measurement unit comprising:
- a test interface for transmitting a number of test commands to a device under test and/or receiving test data from the test device,
- a communication interface for receiving communication signals from the device under test and/or sending communication signals to the device under test, and
- a test controller for evaluating the received communication signals in the measurement unit, wherein the test commands comprise test commands that cause the device under test to perform an instructed internal configuration, and wherein the test commands cause the device under test:
- to set a carrier frequency for the generated communication signals and/or signal reception in the device under test,
- to set a bandwidth for the generated communication signals and/or signal reception in the device under test,
- to set a phase of a specific transmission channel for the generated communication signals and/or reception channel for signal reception in the device under test,
- to set a modulation scheme for the generated communication signals and/or signal reception in the device under test,
- to set a transmit power for the generated communication signals, wherein the respective test commands comprise a single power value or a sequence of power values that the device under test sets at a predetermined step frequency, and
- to set a attenuation factor for the signal reception in the device under test.

42. The measurement unit of claim 41, wherein the test interface transmits the test commands individually to the device under test.

43. The measurement unit of claim 41, wherein the test interface transmits the test commands to the device under test in groups.

44. The measurement unit of claim 43,
wherein the test commands comprise an execution step test command for instructing the device under test to individually execute the test commands based on the execution step command, and/or wherein at least one test command comprises a delay value that instructs the device under test to delay the execution of a following test command according to the delay value specified in the at least one test command, and/or wherein at least one test command comprises a repetition configuration value, that instructs the device under test to repeat a test command until the execution of the next test command if the repetition configuration value is positive, and/or wherein at least one test command comprises a continue-during-repetition configuration value that instructs the device under test to repeat a test command and execute the next test command in parallel if the continue-during-repetition configuration value is positive.

45. The measurement unit of claim 43, wherein after transmitting a group of test commands to the device under test the test interface transmits a test initiation command to the device under test that causes the device under test to initiate the execution of the transmitted group of test commands.

46. The measurement unit of claim 41, wherein the test commands cause the device under test to execute a sequence of test commands stored in the device under test, and/or
  wherein the test interface transmits a synchronization test command to the device under test that synchronizes the device under test with the measurement unit.

47. The measurement unit of claim 41,
  wherein the test interface comprises a wired interface, and/or
  wherein the test interface comprises a wireless interface, especially wherein the test interface comprises a wireless interface that uses other frequencies and/or other modulation schemes than the communication interface; and/or
  wherein the communication interface comprises at least part of the test interface.

* * * * *